3,143,562
PREPARATION OF AROMATIC PEROXY ACIDS
Leonard S. Silbert and Daniel Swern, Philadelphia, Pa., assignors to the United States of America as represented by the Secretary of Agriculture
No Drawing. Filed Mar. 27, 1961, Ser. No. 98,716
8 Claims. (Cl. 260—465)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to the preparation of aromatic peroxy acids and has among its objects the direct conversion of aromatic acids to aromatic peroxy acids.

Peroxybenzoic acid is one of the best known and most useful oxidizing agents in the field of organic chemistry. Among its uses are the epoxidation and hydroxylation of olefins, the conversion of sulfides to sulfoxides and sulfones, and the oxidation of tertiary amines to amine oxides.

The direct preparation of peroxybenzoic acid from benzoic acid and hydrogen peroxide is a problem that has been investigated for a long time, yet to the best of our knowledge all previous attempts at providing a process for direct preparation of this acid and other aromatic peroxy acids have been unsuccessful. For example, the sulfuric acid-hydrogen peroxide system which has been used successfully to make certain aliphatic peroxy acids cannot be used with aromatic compounds. Benzoic acid in sulfuric acid carbonizes on addition of hydrogen peroxide. Addition of hydrogen peroxide to a sulfuric acid solution of p-tertiary-butylbenzoic acid produces a dark-brown viscous solution accompanied by a rapid temperature rise. In these instances and in attempts with other substituted benzoic acids, such as p-nitrobenzoic acid, no peroxy acids are isolated from the reaction mixture. Aromatic peroxy acids are currently prepared by indirect means, and yields are often low and irreproducible.

We have found that it is possible to prepare peroxybenzoic acid and other aromatic peroxy acids in very high yields and in excellent purity by the reaction of the aromatic acid or its ester with hydrogen peroxide using methanesulfonic or ethanesulfonic acid as the solvent and reaction medium.

In general, according to the present invention an aromatic compound of the general formula

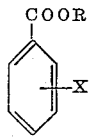

wherein the substituent X is attached in a position ortho, meta, or para with respect to —COOR, R may be H or a short carbon chain alkyl radical, and X is selected from H, $NO_2$, CN, F, Cl, Br, COOR, or an alkyl radical, in alkanesulfonic acid at a temperature in the range of about 10 to 60° C., is contacted with hydrogen peroxide, thus converting the aromatic compound to an aromatic peroxy acid, and the aromatic peroxy acid is separated from the reaction mixture.

In a preferred embodiment of the invention the aromatic acid or ester is combined with at least about a 3 to 1 mole ratio of methanesulfonic acid, to form a solution or a slurry. Then about a 50 to 200% molar excess of hydrogen peroxide, usually as a 90–95% aqueous solution of hydrogen peroxide, is slowly added and mixed with the slurry or solution of aromatic acid or ester while the mixture is maintained at temperatures in the range of 20 to 60° C., (addition of $H_2O_2$ to the aromatic acid or ester in methane sulfonic acid is exothermic). In some cases, 70% hydrogen peroxide is satisfactory.

The amount of methanesulfonic acid employed as the vehicle or reaction medium is primarily selected with consideration of effect upon yield of the reaction, the higher ratios of methanesulfonic acid to aromatic acid or ester allowing more of the aromatic compound to go into solution, in addition to providing a better means of controlling the distribution of the hydrogen peroxide and of controlling the temperature of the mixture.

In the range of operating temperatures of about 20 to 30° C., benzoic acid dissolves readily in methanesulfonic acid when the latter is present in a mole ratio of 3–5 to 1 of the benzoic acid. A mole ratio of 5 to 1 was adopted arbitrarily. Substituted aromatic acids are less soluble, only part going into solution at any one time, but high conversions to peroxy acids are obtained by increasing operating temperature and reaction time. In the case of the least soluble aromatic compound used, terephthalic acid, the dimethyl ester is the preferred reactant.

While formation of peroxy acids may proceed at temperatures of at least as low as 10° C. (cf. footnote (c) of Table I) the use of higher temperatures is preferred. Not only does the rate of reaction with hydrogen peroxide increase, but the solubility of the aromatic compound in the mixture is increased. This is more important when the reactant is a substituted benzoic acid than when using benzoic acid. Another consideration is that the peroxy acid products from substituted benzoic acids are less soluble than their precursors, and although this property facilitates their separation from the mixture, unless additional methanesulfonic acid is used, the mixture may become difficult to stir if temperatures are much lower than 40° C.

Referring to Table I, slightly lower yields of peroxybenzoic acid are obtained at reaction temperature of 40° C. than at 30° C. when the source of hydrogen peroxide is a 50% solution. This is not a problem when the initial concentration of hydrogen peroxide is 90–95% and conversions of 90% or higher of peroxybenzoic acid are obtained at reaction temperatures of 20 to 30° C. in shorter periods of time. In this temperature range the reaction proceeds rapidly, being completed in about one to three hours.

Use of 70% hydrogen peroxide gives only slightly lower yields of peroxybenzoic acid than 90–95% and is a safer reactant to use. Various procedures may be used for separating and purifying the peroxy acid products. Solubility properties of the products in methanesulfonic acid and in water may be utilized to advantage (cf. Example 15) and the insoluble peroxy acid is filtered off. Alternatively, as in Examples 1–11, the product may be extracted from the reaction mixture with a suitable solvent such as benzene. Analytically pure products are readily obtained by recrystallization.

The following examples further illustrates the practice of this invention.

EXAMPLES 1 TO 14

*Preparation of Peroxybenzoic Acid*

Hydrogen peroxide (94%, 1.7–3.3 g.; 0.045–0.09 mole) was added dropwise with stirring to a slurry or partial solution of benzoic acid (3.7 g., 0.03 mole) in methanesulfonic acid (14.4 g., 0.15 mole (in an open tall-form beaker, maintaining the temperature at 20–30° C. in most cases (see Table I). The reaction, exothermic during hydrogen peroxide addition, required 10–15 minutes for its complete addition. Undissolved benzoic acid completely entered solution during this period. A total of one hour was usually sufficient for essentially quantitative reaction. The reaction mixture was cooled below 10° in an ice-bath, chopped ice (10 g.) was cautiously added (*exothermic*) followed by addition of ice-cold saturated ammonium sulfate solution (10 ml.), maintaining the temperature below 25° C. Peroxybenzoic acid was extracted in a separatory funnel with three 20 ml. portions of benzene. The combined benzene extracts were washed with two 10 ml. portions of saturated ammonium sulfate solutions to ensure complete removal of traces of methanesulfonic acid and hydrogen peroxide, dried over anhydrous sodium sulfate, and filtered. The washed benzene solution, containing 90 to 95% yields of peroxybenzoic acid, may be used directly in epoxidation or other oxidation reactions without further isolation.

In these examples the benzene was evaporated at 30° C. in a rotary evaporator to give a light yellow viscous liquid. Peroxybenzoic acid was recrystallized at −20° C. from an olefin-free petroleum ether-ethyl ether cosolvent (6:1) in a ratio of 4 ml. per gram of peroxy acid. It crystallized in long white needles, M.P. 41° C., after seeding the solution at about 5° C. before further cooling.

of 70% hydrogen peroxide gave only slightly lower yields of peroxybenzoic acid (Examples 12–14).

EXAMPLE 15

*Preparation of p-Nitroperoxybenzoic Acid*

Hydrogen peroxide (94%, 3.3 g., 0.09 mole) was added dropwise with stirring to a slurry of p-nitrobenzoic acid (5.0 g., 0.03 mole) in methanesulfonic acid (14.4 g., 0.15 mole) in an open tall-form beaker, maintaining the temperature of reaction at 40° C. Complete addition of hydrogen peroxide required 10 minutes. The slurry thickened as peroxy acid precipitated out. After a total reaction time of three hours, the mixture was cooled to 10–15° C., and crushed ice (10 g.) was added, followed by cautious addition of ice-cold water, maintaining the temperature below 25° C. The mixture was filtered on a Büchner funnel, and the precipitate washed with cold water several times and then dried over a desiccant. A product of 99% purity was obtained in 94% yield. The peroxy acid was crystallized from chloroform (2 g. per 100 ml.) after dissolving at 50° C., seeding the solution and progressively cooling to −20° C. Analytically pure p-nitroperoxybenzoic acid was obtained in 70% yield.

A procedure in general following that described in Example 15, in several instances varying the mole ratios of components in the reaction mixture and employing slightly different reaction conditions, was used to prepare substituted peroxybenzoic acids. The reaction conditions and results are summarized in Table II, Examples 16 to 19.

TABLE II.—REACTION CONDITIONS AND YIELDS OF AROMATIC PEROXY ACIDS

| Example No. | Peroxy acid | Mole ratio, MSA:$H_2O_2$:CA | Temp., °C. | Time, hrs. | Peroxy acid in crude product, percent | Yield, percent [a] | Melting point, °C. |
|---|---|---|---|---|---|---|---|
| 9 | Peroxybenzoic | 5:3:1 | 30 | 1 | 95 | [b] 94 | 41 |
| 15 | p-Nitroperoxybenzoic | 5:3:1 | 40 | 3 | 99 | 94 | [c] 138 |
| 16 | p-tertiary-Butylperoxybenzoic | 5:3:1 | 40 | 3 | 98 | 86 | 81.5–83 |
| 17 | o-Nitroperoxybenzoic | 5:3:1 | 60 | 1 | 99 | 76 | 95–96 |
| 18 | Diperoxyterephthalic: (A) from terephthalic acid | 10:3:1 | 60 | 2 | 20 | | |
| | (B) from dimethyl ester | 20:3:1 | 50 | 2 | 93 | 93 | |
| 19 | p-Cyanoperoxybenzoic | 8:3:1 | 40 | 1 | 95 | 75 | 126–128 |

Abbreviations: MSA is methanesulfonic acid; CA is carboxylic acid.
[a] Calculated by multiplying the purity of the crude product by the percentage yield.
[b] Peroxybenzoic acid determined iodometrically on aliquots of benzene solutions from which hydrogen peroxide was washed out.
[c] Dec.

Data pertaining to these examples is summarized in Table I.

TABLE I.—EFFECT OF SEVERAL VARIABLES ON PEROXYBENZOIC ACID FORMATION [a]

| Example No. | Reaction time, hrs. | Hydrogen Peroxide Initial concn., percent | Hydrogen Peroxide Mole percent excess | Percent conversion to peroxy acid [b] at 20° | at 30° | at 40° |
|---|---|---|---|---|---|---|
| 1 | 1 | 50 | 50 | [c] 34 | 75 | 71 |
| 2 | 3 | 50 | 50 | 66 | 76 | 65 |
| 3 | 5 | 50 | 50 | 74 | | |
| 4 | 7 | 50 | 50 | 78 | | |
| 5 | 1 | 50 | 200 | 56 | | |
| 6 | 1 | 94 | 50 | 94 | 92 | |
| 7 | 3 | 94 | 50 | | 90 | |
| 8 | 1 | 94 | 100 | | 92 | |
| 9 | 1 | 94 | 200 | 94 | 95 | |
| 10 | 2 | 94 | 200 | 95 | | |
| 11 | 1 | 94 | 200 | [d] 97 | [d] 92 | |
| 12 | 1 | 70 | 50 | | 87 | |
| 13 | 2 | 70 | 50 | 89 | [d] 86 | |
| 14 | 3 | 70 | 50 | 88 | | |

[a] Benzoic acid (BA), 3.7 g. (0.03 mole); methanesulfonic acid (MSA) 14.4 g. (0.15 mole); MSA : BA=5:1.
[b] Peroxy acid determined iodometrically on aliquots of benzene solutions from which hydrogen peroxide was washed out.
[c] 7.4% conversion in one hour at 10°.
[d] MSA:BA=3:1.

The reaction was repeated on a scale five times that just described with substantially identical results. Also, use The foregoing examples are presented in illustration of, but are not to be considered as limitations of, this novel, rapid direct procedure for the preparation of aromatic peroxy acids. m- and p-methoxyperoxybenzoic acid could not be prepared from m- and p-anisic acid by the present procedure.

The data of Table II indicate the general use of mole ratios of components in the reaction medium of five moles of methanesulfonic acid to three moles of 90–95% hydrogen peroxide to one mole of the aromatic acid with a reaction time of one to three hours at temperatures of about 30 to 40° C. Higher operating temperatures (up to 60° C.) and higher mole ratios of methanesulfonic acid to aromatic acid (up to 20 to 1) are useful for carboxylic acids having low solubility in the medium. As illustrated with comparison of Examples 18A and 18B, insoluble acids can be advantageously replaced by their more soluble esters to provide higher yields of the peroxy acid.

Methanesulfonic acid as a solvent and reaction medium makes possible the direct preparation of many substituted aromatic peroxy acids, a labile functional group such as the cyano- (Example 19) being retained unchanged in the peroxy acid product.

The use of ethanesulfonic acid in place of methanesulfonic acid, ratio of 4 moles of ethanesulfonic acid to 1 mole of p-nitrobenzoic acid, and reaction with 94% hydrogen peroxide at 30° C. for one hour resulted in a yield of 20% of p-nitroperoxybenzoic acid. Much higher yields are obtainable using the operating conditions of Example 15, but at present there is no apparent advantage in employing ethanesulfonic acid, or other homologous sulfonic acids, in place of methanesulfonic acid in the present process.

We claim:
1. A process for the preparation of an aromatic peroxy acid comprising contacting an aromatic compound of the general formula

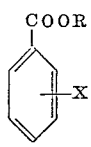

wherein R is selected from the group consisting of H and a short carbon chain alkyl radical, and X is selected from the group consisting of H, $NO_2$, CN, F, Cl, Br, COOR and an alkyl radical, in a reaction medium selected from the group consisting of methane sulfonic acid and ethane sulfonic acid at a temperature in the range of about 10 to 60° C., with hydrogen peroxide, thus converting the aromatic compound to an aromatic peroxy acid, and separating the aromatic peroxy acid from the reaction mixture.

2. The process of claim 1 in which the aromatic compound is benzoic acid.
3. The process of claim 1 in which the aromatic compound is p-tertiary-butylbenzoic acid.
4. The process of claim 1 in which the aromatic compound is p-nitrobenzoic acid.
5. The process of claim 1 in which the aromatic compound is o-nitrobenzoic acid.
6. The process of claim 1 in which the aromatic compound is terephthalic acid.
7. The process of claim 1 in which the aromatic compound is the dimethyl ester of terephthalic acid.
8. The process of claim 1 in which the aromatic compound is p-cyanobenzoic acid.

References Cited in the file of this patent
UNITED STATES PATENTS

| | | |
|---|---|---|
| 2,448,252 | Cornthwaite et al. | Aug. 31, 1948 |
| 2,813,896 | Krimm | Nov. 19, 1957 |
| 3,079,411 | Silbert et al. | Feb. 26, 1962 |

FOREIGN PATENTS

| | | |
|---|---|---|
| 803,159 | Great Britain | July 29, 1957 |

OTHER REFERENCES

Silbert et al.: J. Org. Chem., vol. 27 (1962), pp. 1336–1342.